Dec. 28, 1926.
L. M. ASPINWALL
1,612,345
BRAKING APPARATUS
Filed Feb. 14, 1921
2 Sheets-Sheet 1
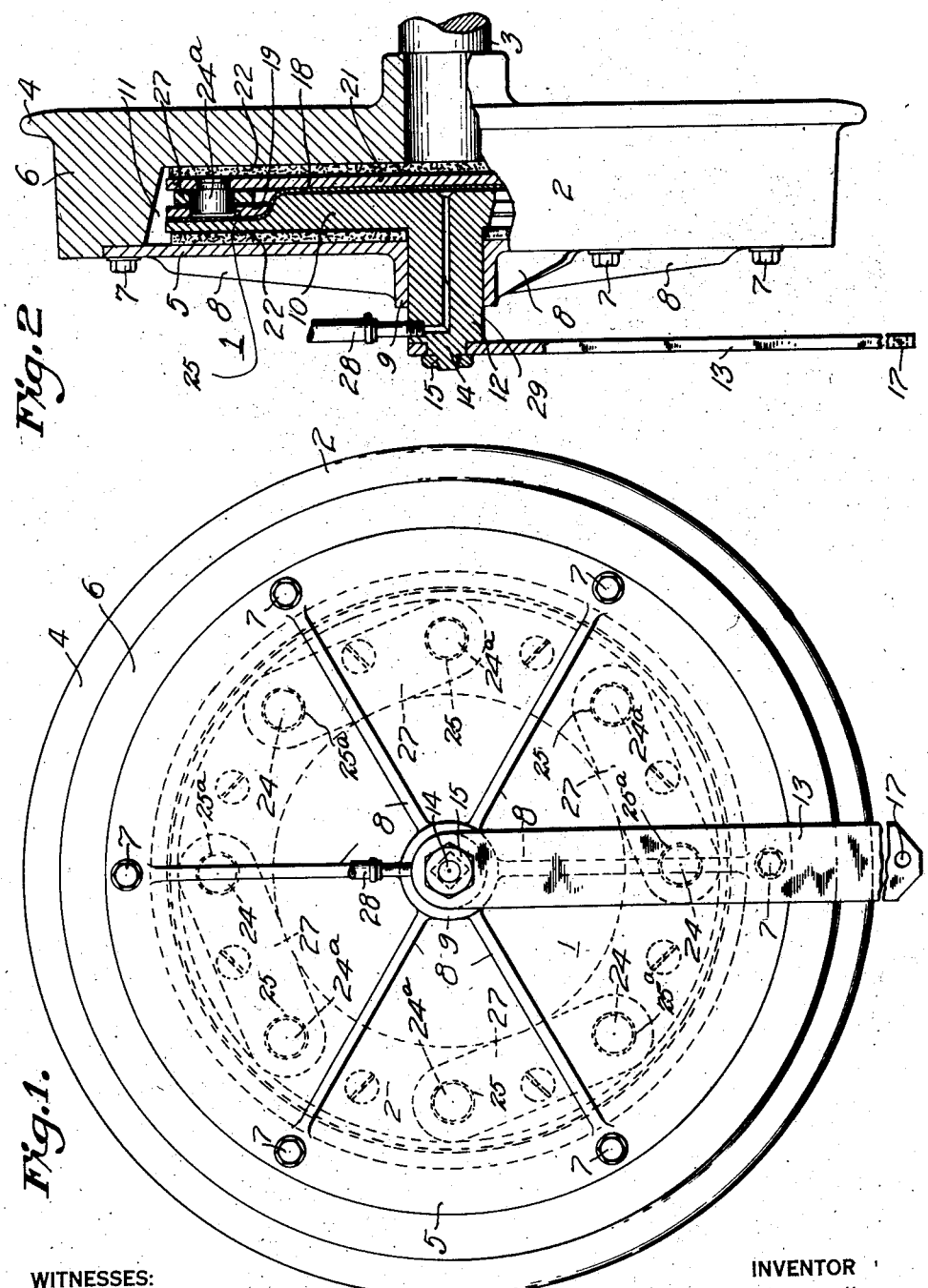
WITNESSES:
INVENTOR
Louis M. Aspinwall,
BY
ATTORNEY Dec. 28, 1926.

L. M. ASPINWALL 1,612,345

BRAKING APPARATUS

Filed Feb. 14, 1921    2 Sheets-Sheet 2

WITNESSES:
R. S. Harrison
H. C. Lowe

INVENTOR
Louis M. Aspinwall.
BY
Wesley G. Carr
ATTORNEY

Patented Dec. 28, 1926.

1,612,345

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

BRAKING APPARATUS.

Application filed February 14, 1921. Serial No. 444,638.

My invention relates to braking apparatus and it has particular relation to pneumatic brakes for one-man cars and other vehicles.

The object of my invention is to provide a relatively simple pneumatic brake which shall dispense with the brake cylinder and intermediate levers by applying the braking force directly to the face of the wheel. This arrangement is simple in construction, positive and effective in operation, does away with brake-shoe dust and reduces wear on tires. The wearing parts of the brake are so designed that they may be readily replaced.

Briefly speaking, my invention consists in having a stationary member rigidly positioned relatively adjacent to a rotatable member and providing a movable but non-rotatable member which is secured to the stationary member, and which may be brought into frictional engagement with the rotatable member upon the application of fluid pressure to a diaphragm that is located between the stationary member and the movable member.

Figure 3:
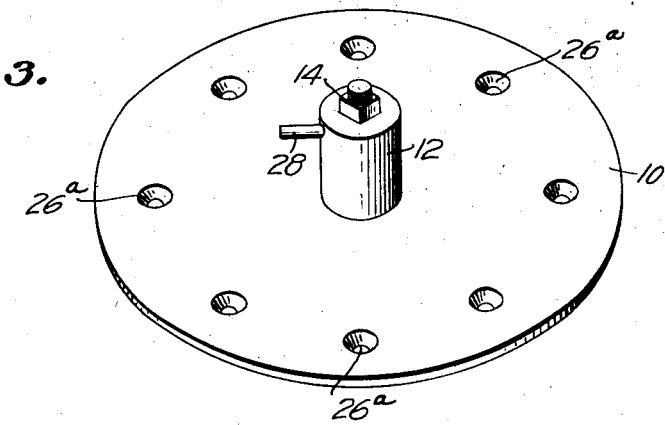
Figure 4:
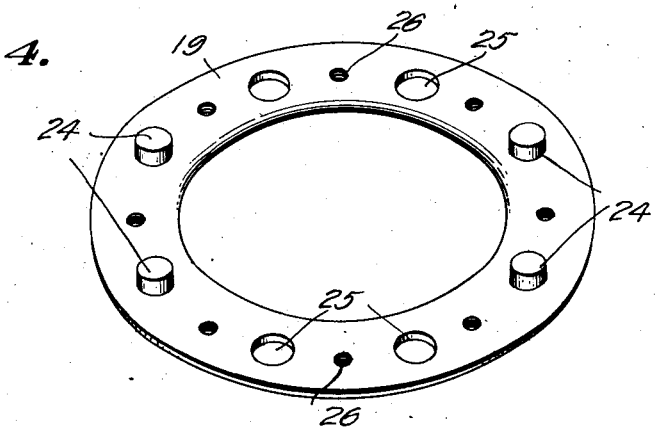
Figure 5:
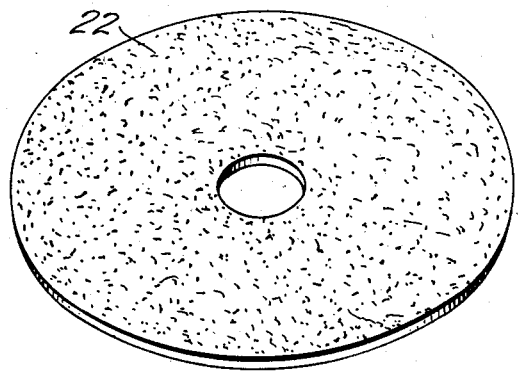

For a better understanding of my invention, reference may be made to the accompanying drawing, Figure 1 of which is a view, in end elevation, of a car wheel and braking mechanism embodying my invention;

Fig. 2 is a view, partially in cross-section and partially in side elevation, of the braking mechanism of the car wheel shown in Fig. 1; and Figs. 3, 4 and 5 are views, in perspective, of parts of the braking mechanism.

Referring particularly to Figs. 1 and 2 of the drawings, a braking mechanism 1 is mounted within a car wheel 2, which is rigidly secured to an axle 3. The car wheel 2 is provided on opposite sides with a flange 4 and a removable cover member 5. The cover member 5 is mechanically connected to the rim 6 of the wheel 2 by means of a plurality of bolts 7. The cover 5 is provided with a plurality of radially-extending ribs 8 which extend from the hub portion 9 of the cover 5.

A stationary member or plate 10 is mounted within a cavity 11, which is located between the wheel 2 and the cover 5 and is provided with an integral hub portion 12. A torque arm 13 is rigidly mounted by means of a nut 15, upon an end projection 14 of the hub portion 12 of the stationary member 9 (see Fig. 3). The other end of the torque arm 13 is provided with a hole 17 for aid in securing it to a car body (not shown).

A diaphragm or disc 18, of leather or other suitable material, is secured to the stationary member 10 by means of an annular member 19 which is positioned near the periphery of the stationary member 10. A movable member or plate 21 is positioned between the stationary member 10 and the car wheel 2. Annular braking discs 22 (see Fig. 5), made of some suitable material, such, for example, as woven and treated asbestos, are positioned between the cover member 5 and the stationary member 10 and between the car wheel 2 and the movable member 21.

For a better understanding of the annular member 19, reference should be made to Fig. 4, in which the member 19 is shown as provided with a plurality of projecting studs 24 and a plurality of holes 25 and 26. The holes 26 are provided for rigidly securing the diaphragm 18 to the stationary member 10 which is also provided with corresponding holes 26a (see Fig. 3). The pressure of the annular member 19 upon the diaphragm 18 maintains it in intimate contact with the stationary member 10.

The movable member or plate 21 is provided also with a plurality of studs 24a and holes 25a which correspond to those shown upon the annular member 19 (see Figs. 1 and 2). The studs 24a of the plate 21 are adapted to engage the holes 25 upon the annular member 19 and, likewise, the studs 24 of the member 19 are adapted to engage the holes 25a of the movable member or plate 21.

A plurality of links or flat bars 27, shown in Figs. 1 and 2, are provided for mechanically connecting the studs 24 of the annular member 19 to the studs 24a of the movable member 21, thereby preventing the rotation of the member 21. The purpose of the studs 24a and 24 and the holes 25 and 25a is to permit horizontal movement of the movable member 21 with respect to the stationary member 10.

Fluid pressure for actuating the diaphragm 18 is supplied from pipe 28 (shown in Figs. 1 and 2) through an opening 29 in the hub portion 12 of the stationary member 10.

The operation of the brake mechanism 1 is effected by supplying fluid pressure from a suitable source through the pipe 28 and thence, through the opening 29, to the diaphragm 18. The pressure upon the diaphragm 18 causes it to force the movable member 21 and the stationary member 10 apart. Pressure applied to the stationary member 10 and the movable member 21 is transmitted, through the respective discs 22, (see Fig. 5) to the cover member 5 and to the wheel 2. It is to be understood that relatively slight movement of the stationary member 10 will occur in the direction corresponding to that of the axis of the shaft 3, as the pressure upon the members 10 and 21 is equal. The braking action may be controlled by regulating the fluid pressure which is applied to the diaphragm 18.

It will be noted that the studs 24 and the holes 25 of the annular member 19 and the studs 24a and holes 25a of the movable plate member 21 are not similarly positioned on the two members. The purpose of the dissimilar arrangement of the respective sets of studs and of holes is to so mount the links 27 that, during braking, two of the links will always tend to operate in compression and two of the links in tension, regardless of which way the wheel 2 is rotating.

The radial ribs 8 forming part of the cover member 5 serve a two-fold purpose, by stiffening the cover member 5, and serving as a fan to cool the braking mechanism 1.

It is to be understood that the method of securing braking action may also be employed for a clutch device of substantially similar design.

While I have shown my invention in a preferred form, it is apparent that modifications may be made in the shapes and positions of the parts of the braking mechanism without departing from the spirit of my invention. I desire, therefore, to be limited only by the scope of the appended claims.

I claim as my invention:

1. The combination with a rotatable member having a recess, of a cover member for said recess, and retarding means for said rotatable member located in said recess and comprising a substantially stationary member and a movable member, and means for introducing fluid under pressure between said movable and stationary members to respectively effect a retarding action thereof upon said rotatable member and said cover member.

2. The combination with a rotatable member, of a stationary member, a movable member positioned between said other members, said stationary and movable members being each provided with a plurality of projections fitting into co-operating recesses in the other, and a plurality of link members for connecting certain pairs of said projections.

3. The combination with a rotatable member, of a stationary member, a movable member positioned between said members, means for securing said movable member to said stationary member for preventing the rotation of said movable member, and a plurality of link members joining certain pairs of said means whereby said link members alternately operate in tension or compression in accordance with the direction of operation of said rotatable member.

4. The combination with a rotatable member, of a stationary member, a movable member positioned between said other members, said stationary and movable members being each provided with a plurality of sets of studs fitting into recesses in the other, and a plurality of link members connecting alternate pairs of adjacent studs whereby part of said links operate in compression and part in tension irrespective of the direction of rotation of said rotatable member.

5. The combination with a rotatable member, of a member fixed against rotation and a movable intermediate member, links connecting said intermediate and fixed members, a diaphragm secured to the latter and pressure actuating means for said diaphragm to effect relative axial displacement of said members.

6. The combination with a rotatable member, of a member fixed against rotation, a movable intermediate member linked to said fixed member, a friction disc disposed between said movable and said rotatable members and between said movable and fixed member, a flexible diaphragm secured to said fixed member and pressure-actuated means communicating therewith to effect engagement of said friction disc with their co-operating contact surfaces.

7. The combination with a wheel having a recessed central portion, of a hub having a torque rod connection to the vehicle frame disposed therein, a diaphragm secured to said hub, a movable disc disposed between said diaphragm and wheel, a cover plate secured to the wheel enclosing said hub, friction discs disposed between said hub and cover plate and said movable disc and wheel and liquid-pressure-actuated means for said diaphragm to engage said friction discs with their co-operating contact surfaces.

8. The combination with a wheel having a recessed central portion, of a hub having a torque rod connection to the vehicle frame disposed therein, a diaphragm secured to said hub, a movable disc disposed between said diaphragm and wheel, a cover plate secured to the wheel enclosing said hub, friction discs disposed between said hub and cover plate and said movable disc and wheel and liquid-pressure-actuated means for said diaphragm to effect relative axial displacement of said movable disc and hub.

In testimony whereof, I have hereunto subscribed my name this 5th day of February 1921.

LOUIS M. ASPINWALL.